(12) United States Patent
Kalb et al.

(10) Patent No.: US 9,634,997 B2
(45) Date of Patent: Apr. 25, 2017

(54) AUTOMATIC GENERATION AND REGISTRATION OF ALTER-EGO WEB SERVICE ACCOUNTS

(71) Applicant: StoryCloud, Inc., San Diego, CA (US)

(72) Inventors: Kenneth J. Kalb, Solana Beach, CA (US); Michael W. Tracy, Solana Beach, CA (US); Barry Shapira, Solana Beach, CA (US)

(73) Assignee: STORYCLOUD INCORPORATED, San Diego, CA (US)

( * ) Notice: Subject to any disclaimer, the term of this patent is extended or adjusted under 35 U.S.C. 154(b) by 0 days.

(21) Appl. No.: 14/328,559

(22) Filed: Jul. 10, 2014

(65) Prior Publication Data

US 2016/0014093 A1    Jan. 14, 2016

(51) Int. Cl.
*H04L 29/06*    (2006.01)

(52) U.S. Cl.
CPC .......... *H04L 63/0421* (2013.01); *H04L 63/08* (2013.01)

(58) Field of Classification Search
CPC .................................................. H04L 63/0421
USPC .............................................................. 726/4
See application file for complete search history.

(56) References Cited

U.S. PATENT DOCUMENTS

| | | | | |
|---|---|---|---|---|
| 7,412,526 B2 * | 8/2008 | Fujisawa | ....................... | 709/229 |
| 7,472,423 B2 * | 12/2008 | DeCenzo | ............... | H04H 60/33 |
| | | | | 348/E7.072 |
| 8,190,878 B2 * | 5/2012 | Stern et al. | ................... | 713/153 |

\* cited by examiner

*Primary Examiner* — Longbit Chai
(74) *Attorney, Agent, or Firm* — Arent Fox LLP

(57) ABSTRACT

Some aspects provide a method and system for providing a user with an anonymous identity. Some aspects receive a request to switch an account associated with a web service to an anonymous account. Some aspects provide login credentials associated with the anonymous account to the web service. The anonymous account is randomly generated by a service that is different from the web service.

8 Claims, 11 Drawing Sheets

AUTOMATIC GENERATION AND REGISTRATION OF ALTER-EGO WEB SERVICE ACCOUNTS

BACKGROUND

Social media services are typically internet based applications that provide users around the world with an opportunity to interact with other users and exchange content. Social media can take on many different forms, such as forums, blogs, social networks, video logs (vlogs), photograph and/or video sharing, wikis, and wall-posting. However, one thing the majority of social media services share is a requirement that users create accounts with verifiable information. Usually this verifiable information is a valid email address that the user must verify through some sort of verification scheme before the account is created. Typically, only one account can be associated with an email address and the average user may not maintain more than one active email account.

Users of social media services frequently use these services as a mechanism for expressing personal beliefs, feelings, and potentially strong viewpoints. However, sometimes these expressions may contain offensive or inflammatory messages that pose the risk of alienating and/or offending certain users. Due to this risk, users may be uncomfortable with sharing certain information or content using social media services because they do not want to risk offending friends, colleagues, and other acquaintances that may know the users personally. In some instances, personal friends of users may even be able to associate their social media accounts with them. Therefore, some users may wish to create additional accounts that are randomly generated to anonymously exchange content. However, the requirement of having a verifiable email account makes it difficult and time consuming to create more than one user account with any social media service.

SUMMARY

Some aspects of the disclosure provide novel methods for generating, registering, and logging in anonymous alter-ego accounts for verified users. In some aspects, a user using a web service, such as a social media website may view the website on an internet browser window at a client device. The browser, of some aspects may have a plug-in installed that causes a selectable UI object, such as a button, to appear in the browser window. In some aspects, a user may interact with the selectable UI object to create, register, and/or log in using an anonymous alter-ego account.

Some aspects of the disclosure provide a system that is capable of communicating with the client and social media service. The system may be a web server capable of sending and receiving instructions to create, register, and login anonymous alter-ego accounts. In some aspects, the system also maintains verifiable user information that is associated with each alter-ego account that the system creates for the user. The system maintains the alter-ego account information as well as the verified user information, which provides a mechanism for user accountability even when using an anonymous alter-ego login.

In some aspects of the disclosure, the system communicates with the web services through an Application Programming Interface (API) to access the registration and login functionality of the social media web service. Upon receiving a request to register or login an alter-ego account, the server will communicate through function calls to web service's API in order to register and login a user in the background (e.g., without any user interaction). This background process makes the registration and login process appear seamless to the user.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The word "exemplary" is used herein to mean serving as an example, instance, or illustration. Any embodiment described herein as "exemplary" is not necessarily to be construed as preferred or advantageous over other embodiments. Likewise, the term "aspect" of an apparatus, method or article of manufacture does not require that all embodiments of the invention include the described components, structure, features, functionality, processes, advantages, benefits, or modes of operation.

Several aspects of a web service that generate anonymous and verifiable alter-ego accounts with social media services will now be described. Providing a service that is capable of generating alter-ego accounts for various social media services provides a user with the anonymity necessary to feel comfortable enough to post the user's strong thoughts, feelings, and/or beliefs without the risk of repercussion in the user's personal life. Additionally, creating random accounts provides a lower likelihood of recognizing the user's actual identity. The alter-ego generation service also provides the social media service provider and other users with the comfort of accountability because all alter-ego accounts that are created for the various social media web services are associated with a verified user. If a user chooses to use an alter-ego account to participate in nefarious activities on the social media website, the social media service provider may alert the alter-ego account provider to take disciplinary action against the alter-ego user. Such actions may include blocking the user from using or registering any alter-ego accounts with the social media service for a pre-determined period of time or removal of the user's account on the alter-ego service so that he may no longer create alter-egos for any social media service.

Figure 1:
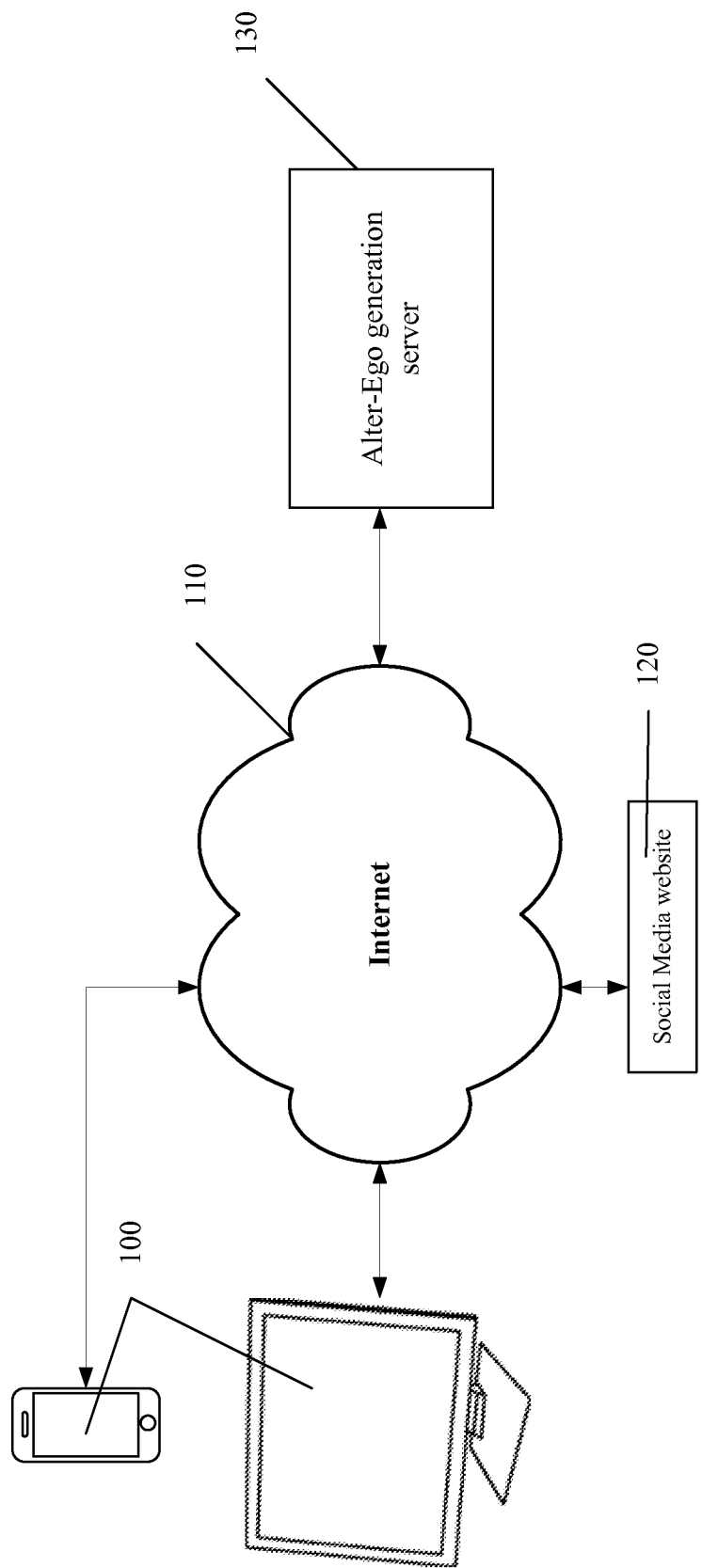
FIG. 1 illustrates an exemplary network architecture of one aspect of the alter-ego generation service.

FIG. 1 illustrates an exemplary network architecture of one aspect of the alter-ego generation service. The network architecture includes a client 100, an Internet service 110, a social media website 120, and alter-ego generation server 130. The client 100 communicates over a network interface with the Internet 100. In some aspects, the client may be a personal computer (e.g., desktop or laptop), a tablet, personal data assistant (PDA), a Smartphone, or any other device capable of accessing the Internet. The client may use an internet service provider to access the Internet through the network interface. The client 100 may gain access to the social media website over the Internet 110. The client may also communicate with the alter-ego generation server 130 over the Internet 110. The alter-ego generation server 130 may also communicate with a social media website 120 and the client over the Internet 110.

Figure 2:
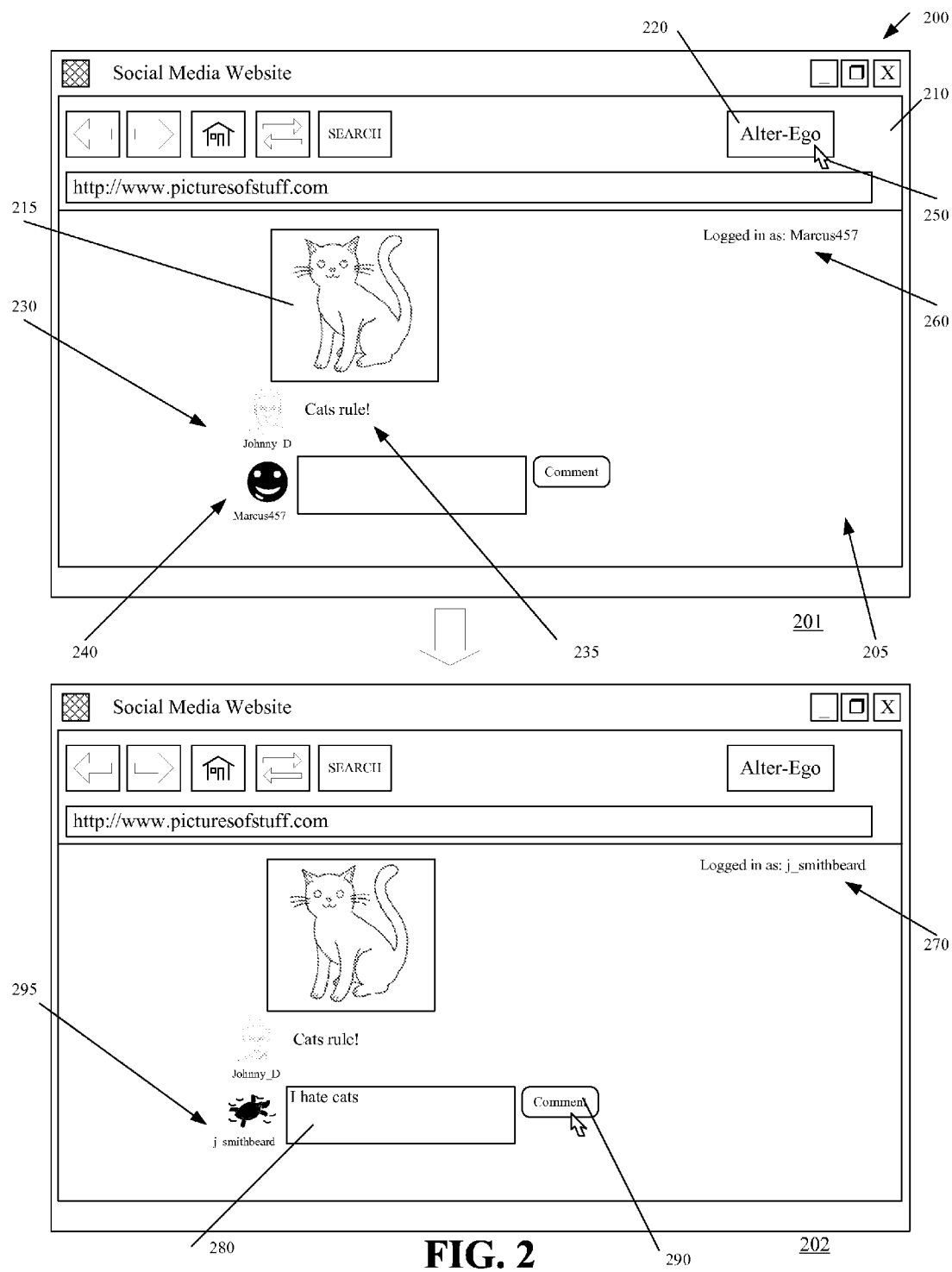
FIG. 2 illustrates an exemplary web browser window that may be displayed on a client.

FIG. 2 illustrates an exemplary web browser window 200 that may be displayed on a client. Through the web browser, the client receives commands to transmit a request to the alter-ego generation service to generate and switch to alter-ego accounts. In an exemplary aspect, the web browser may use a software component, such as a plug-in, that adds a user interface tool that may be used to initiate communication with the alter-ego generation service. The user interface (UI) tool of some aspects may be a clickable button or any other interactive UI object. FIG. 2 illustrates two stages 201 and 202 of a user's interaction with the web browser displayed on the client. The web browser display includes a display regions 205 and 210, a selectable alter-ego generation UI object 220, user representations 230 and 240, a photo 2015, comment 235, a cursor 250, user account information 260, alter-ego user representation 295, text box 280, another selectable UI object 290, and alter-ego user account information 270.

Several selectable UI objects (e.g., buttons, text boxes, etc.) that are typically associated with web browsers and provide different web browsing functionalities are displayed in display region 210. Selectable alter-ego provider UI object 220 is also displayed in display region 240. The display region 205 displays several exemplary UI objects that may be displayed when a user is logged into a social media service such as account information 260, comment 235, text box 280, selectable UI object 290, and user representations 230 and 240. In one aspect, the user representation may be a username, avatar, or a combination of a username and avatar.

The first stage 201 illustrates a web browser after a user has logged into a social media service. In this example, a user with the username, "Marcus457" has logged into an account that is associated with the social media service displayed in the browser window. The user, Marcus457, of this example, is a verified user that has been verified by the social media service's verification scheme. For instance, Marcus457 created this account using the typical account creation and verification process provided by the social media web service. In such instances, Marcus457 manually entered a non-random username and his personal details, such as his personal name, address, and email address. In this example, the social media web service may utilize a verification scheme to verify that the user, Marcus457, has a valid email address. Additionally, the social media web service may verify that user Marcus457 does not have any other accounts associated with the same email address. If user Marcus457 already has another account associated with the social media service, then he may be denied registration.

The first stage 201 also illustrates that a user, John_Doe has posted a comment to the social media service. In this example, the user, "John_Doe" may be a friend of user Marcus457. In some aspects the friendship is a personal relationship outside of the social media web service. The friendship may also be a programmatic link between the two users that is maintained by the social media service, in one aspect.

In this example, John_Doe has posted a photo and a positive comment about cats. However, Marcus457 may wish to make a negative comment associated with cats, but does not want John_Doe to know that his strong feelings about cats. This comment is probably related to photo 215, which may be a photo of John_Doe's cat.

In this example, Marcus457 selects the alter-ego selectable UI object using cursor 250 to automatically switch to an alter-ego account. In one aspect, the transition to the alter-ego account occurs seamlessly to the user. For instance, the user associated with account Marcus457 may interact with the "alter-ego" button. Upon clicking the alter-ego button, display area 205 displays account information associated with a completely different account. Such interactions with the alter-ego button may include clicking a mouse that controls a cursor 250 on the screen or user interaction with a touch screen device such as a PDA, tablet, or smart phone.

The second stage 202 shows an exemplary web browser window that may display after the client receives user input, such as a click of the alter-ego button, to switch to an alter-ego account. In this example, the user account information 260 shown in the first stage has changed to alter-ego user account information 270. Additionally, user representation 240 has changed to alter-ego account representation 295 to reflect the switch to the alter-ego account. In one aspect, the alter-ego account information and representation are randomly generated by the alter-ego generation server. By using randomly generated account information, other users of the social media web service are less likely to identify the identity of the person using the alter-ego account.

Now that that the user is logged in using the alter-ego account, in the second stage, he may anonymously post any confrontational or offensive comments such that John_Doe does not recognize that the comments are actually coming from an alter-ego associated with Marcus457. Here, Marcus457's alter-ego, j_smithbeard has entered his negative feelings about cats in text box 280. He may post the comment anonymously to the social media service by interacting with selectable UI object 290.

Figure 3:
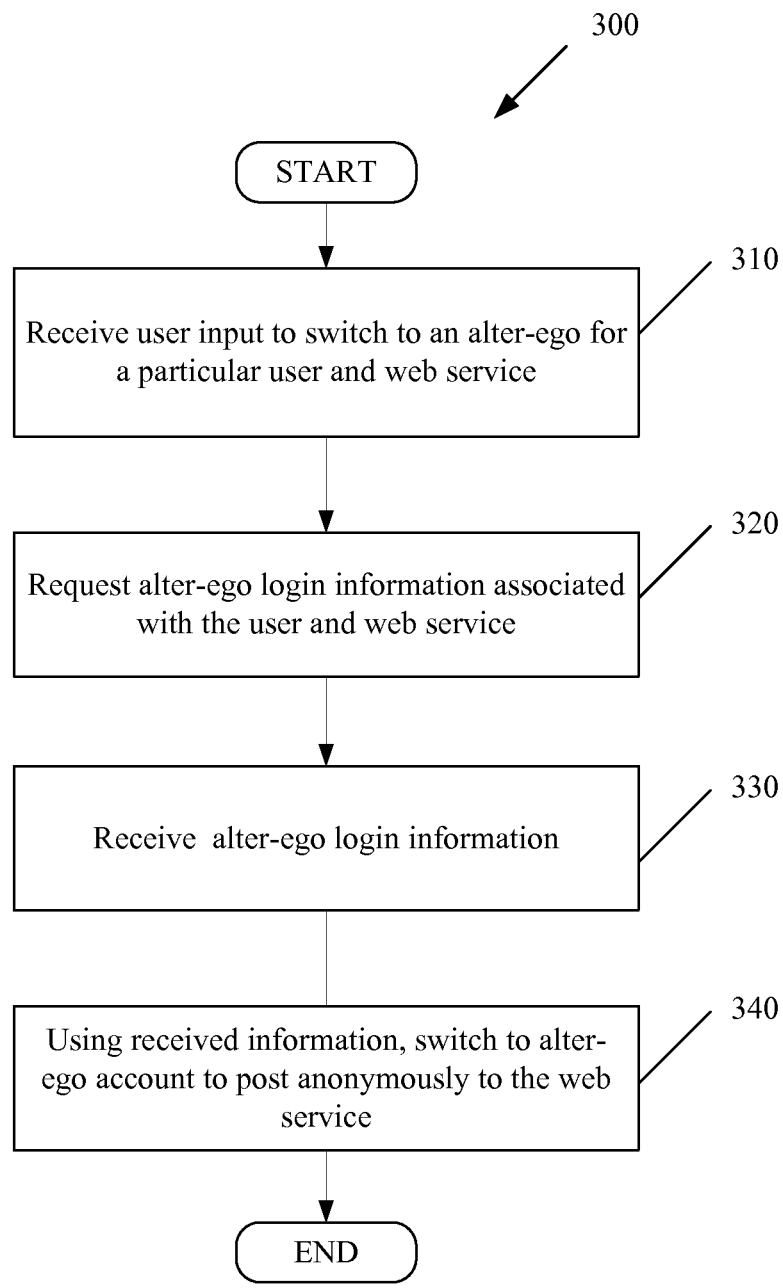
FIG. 3 conceptually illustrates a process that may be performed to switch a user account to an account to an alter-ego account.

FIG. 3 conceptually illustrates a process 300 that may be performed to switch a user account to an account to an alter-ego account. In one aspect, the process 300 is performed by a client device accessing a web service such as a social media website.

As shown, the process receives (at 310) user input to switch to an alter-ego account associated with a particular user and web service. In one aspect, the web service may be a service that is being concurrently accessed by the client performing process 300. The user may also be concurrently logged on to the web service using his primary account for the service. Alternatively or conjunctively the user may be a user of a service that is not associated with the web service being accessed by the client. The user input may be received from a user click of a button displayed in an internet browser window, such as UI object 220 illustrated in FIG. 2. The user input may also be some other type of user interaction with the web browser.

After receiving the user input, the process 300 may request (at 320) alter-ego login information associated with the user and the web service. The process 300 may send this request to an external server that stores the alter-ego information and associated data, such as the alter-ego generation server 130 illustrated in FIG. 1. At 330, the process 300 may receive alter-ego login information. The alter-ego login information may be a username and password. Alternatively, the alter-ego login information may be information used to create a new account with the web service. After receiving the login information, the process 300 may use the alter-ego login information to switch (at 340) to the alter-ego account, allowing the user to post anonymously to the web service being accessed by the client. The process completes after switching to the alter-ego account associated with the web service and user.

Figure 4:
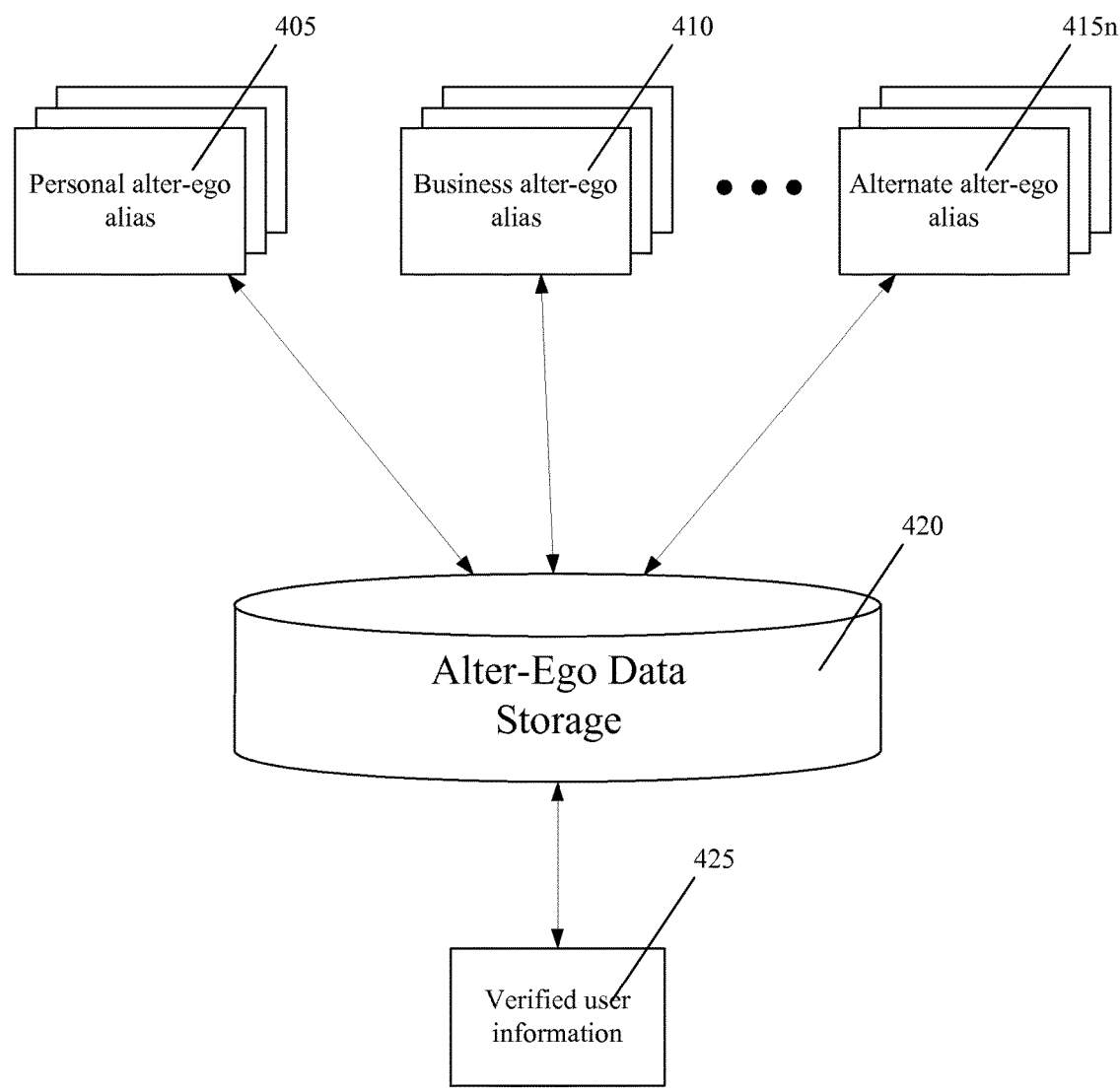
FIG. 4 illustrates an exemplary content that may be maintained on an alter-ego storage for one particular user.

FIG. 4 illustrates an exemplary content that may be maintained on an alter-ego storage 420 for one particular user. The content, in this example, includes aliases 405-415 and verified user information 425. In this example, the user is a verified user that may be verified using a verification scheme. Such verification schemes, in this example, may include verification of a valid email account by requiring a user to interact with an email that the service sends to the email account provided by the user. The verified user information 425 is maintained on a storage in the alter-ego server. However, in other aspects, the alter-ego server maintains content for any number of different users. Various alter-ego aliases 405-415n may also be stored in the alter-ego data storage 420. For instance, a user may wish to have different alter-ego aliases that service different purposes, such as an alter-ego for personal use, business use, or any number of specific or general uses. Moreover, in this example, the user may have several different personal alter-ego accounts. These accounts may, for example be associated with different social media services, or at least two may be associated with the same social media service. When at least two different aliases exist for one social media service, some aspects may provide the user with the capability of toggling between different accounts using the UI provided by the alter-ego plug-in that is installed on the web browser.

Additionally, in one aspect, alter-ego aliases/accounts may have a time of expiration. For instance, a particular personal alter-ego account associated with a particular social media service may have a lifetime of 72 hours, at which point a new alter-ego alias is created upon receiving a request to log in using an alter-ego account. In one aspect this duration may be set during alter-ego generation, or it may be a default setting within the alter-ego generation service. Setting a time of expiration for alter-ego accounts also helps to maintain anonymity.

The alter-ego data storage 420 also maintains verified user information that is associated with all of the alter-ego accounts 405-415. The alter-ego accounts 405-415 provide the alter-ego provider user with the anonymity to post or share potentially offensive media without the risk of repercussion from other users. Conversely, maintaining the verified user data and an association with the alter-ego aliases provides accountability so that the social media service can request action be taken when a user is engaging in behavior, using an alter-ego account, that violates the social media service's terms of service. For example, if a user continuously uses different alter-egos to engage in the same unacceptable behavior, the social media service may request that the alter-ego provider suspend alter-ego generation for the user.

Figure 5:
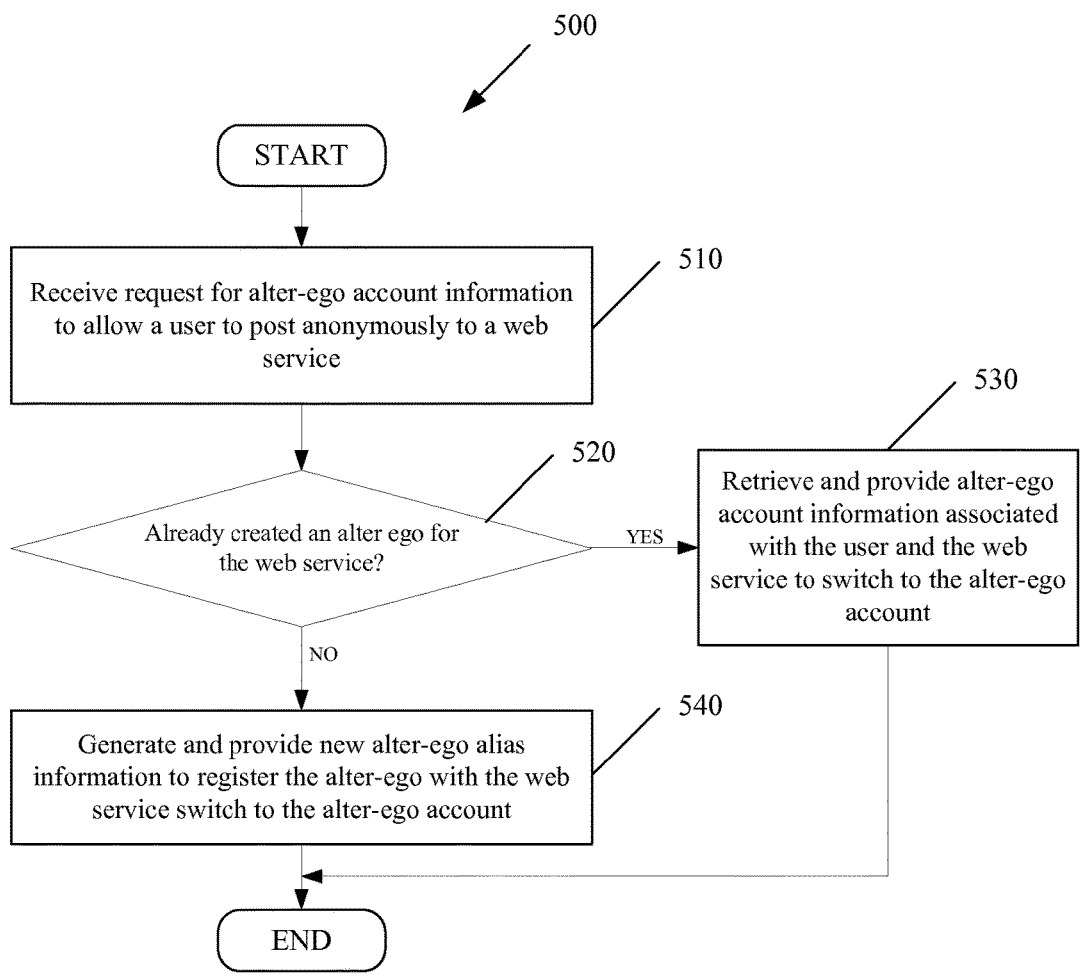
FIG. 5 conceptually illustrates a process that may be performed to generate and/or provide alter-ego accounts to various web services.

FIG. 5 conceptually illustrates a process 500 that may be performed to generate and/or provide alter-ego accounts to various web services such as social media websites. The process 500 may be performed by a server that accesses the various web services using the web services' application programming interface (API). As shown, the process 500 receives (at 510) a request for alter-ego account information. The alter-ego account information ultimately allows a user using a web service at a client to post information anonymously to the web service.

After receiving the request for alter-ego information, the process 500 determines (at 520) whether an alter-ego account has already been created for the web service. When the process 500 determines that a alter-ego account has already been created, the process 500 retrieves and provides (at 530) the alter-ego account information associated with the user and the web service so that the web service has the information it needs to switch to the alter-ego account. This information may be login information such as a username and password. When the process 500 determines (at 520) that an alter-ego account has not already been created (or has expired) for the web service, the process 500 generates and provides (at 540) new alter-ego alias information to register the alter-ego with the web service so that the web service can create a new alter-ego and switch to the newly created alter-ego. The new alter-ego information may be provided to the web service by using web service's API. The API may provide the capability to read the information received from the alter-ego generation server and create the new alter-ego account. After the newly generated or retrieved alter-ego information is provided to the web service, the process 500 ends. Generation of the new alter-ego account is described in more detail in the following figure (FIG. 6)

Figure 6:
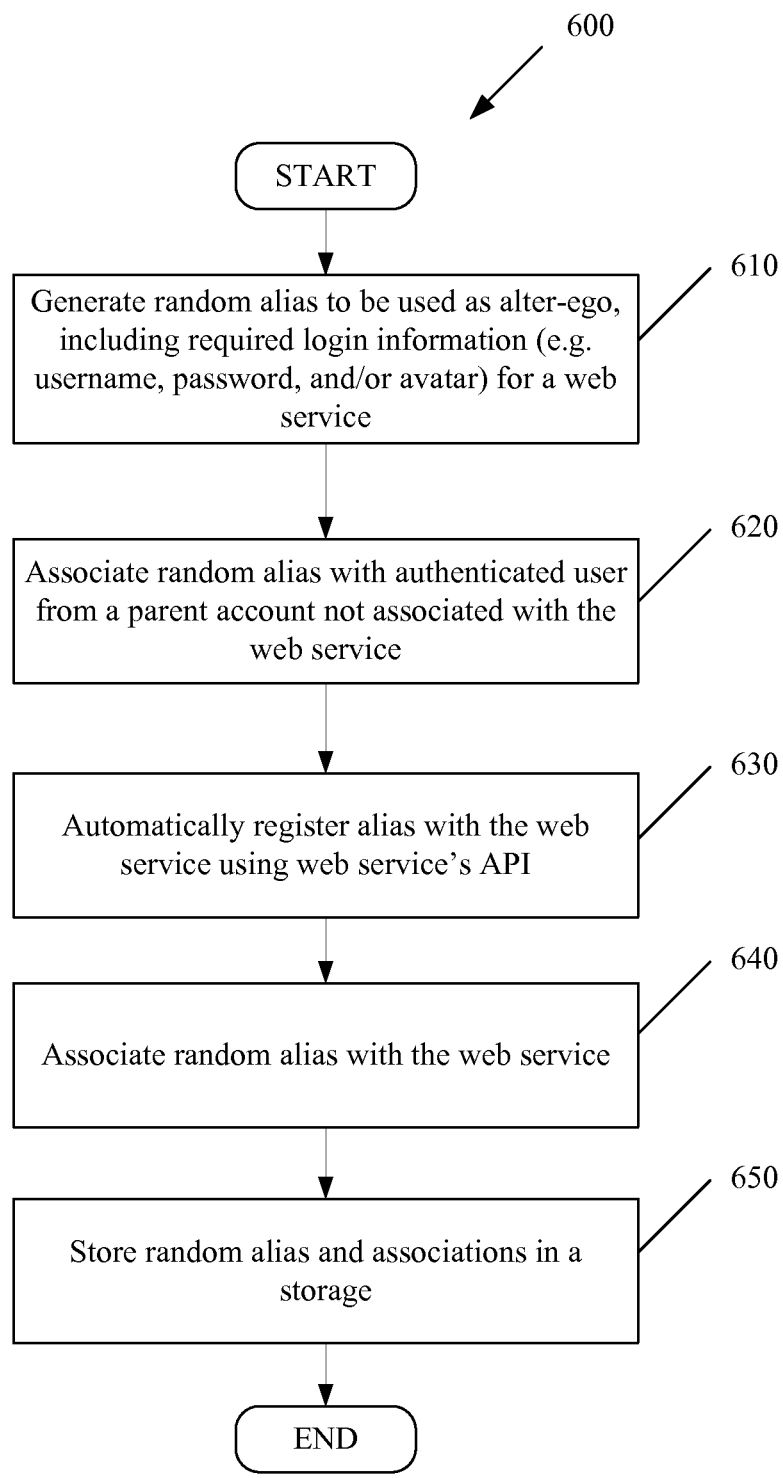
FIG. 6 conceptually illustrates a process for generating an alter-ego account.

FIG. 6 conceptually illustrates a process 600 for generating an alter-ego account. In one aspect, the process 600 may be performed by a server configured to generate and provide alter-ego account information to various web services, such as the alter-ego generation server 130 described in FIG. 1. In one aspect, the process 600 starts after the determination is made that an alter-ego account associated with the web service does not exist (or has expired). In another aspect, the process 600 may begin after receiving user input to create a new alter ego account.

As shown, the process 600 generates (at 610) a random alias to be used as an alter-ego account. Along with generating the random alias, the process 600 also generates the required login information needed for creating an account with the web service such as a username, password, avatar, and a verifiable email address. In one aspect, the required login information is provided to the web service by using functionality provided in the web service's API. Such functionalities may include the capability of receiving and registering the new alter-ego accounts with the web service.

Next, the process 600 associates (at 620) the random alias with an authenticated user from a parent account that is not associated (e.g., an alter-ego service account) with the web service. The purpose of associating the alter-ego with the parent account, in one aspect, is for accountability. If the user uses the alter-ego account to engage in nefarious activity, or activity that violates a social media service's terms of use, it is still possible to trace the alter-ego account back to identify the person engaging in the unacceptable activity.

The process 600 automatically registers (at 630) the alias with the web service. In one aspect this registration may take place by providing the registration information to the web service by using functionality provided by the web service's API. Functionality, provided through the API may also generate the alter-ego account for the web service. Next, the process 600 associates (at 640) the random alias with the web service and stores (at 650) the web service and parent account associations in a storage. In one aspect, this storage is located on a server that runs the alter-ego service, such as alter-ego generation server 130 as described in FIG. 1.

As described in the foregoing description, the alter-ego service provides associations between a verified user and various alter-egos. In some aspects, the alter-ego service may process virtual information that is verifiable through the alter-ego service in order to produce alter-ego accounts for various social media web services.

Figure 7:
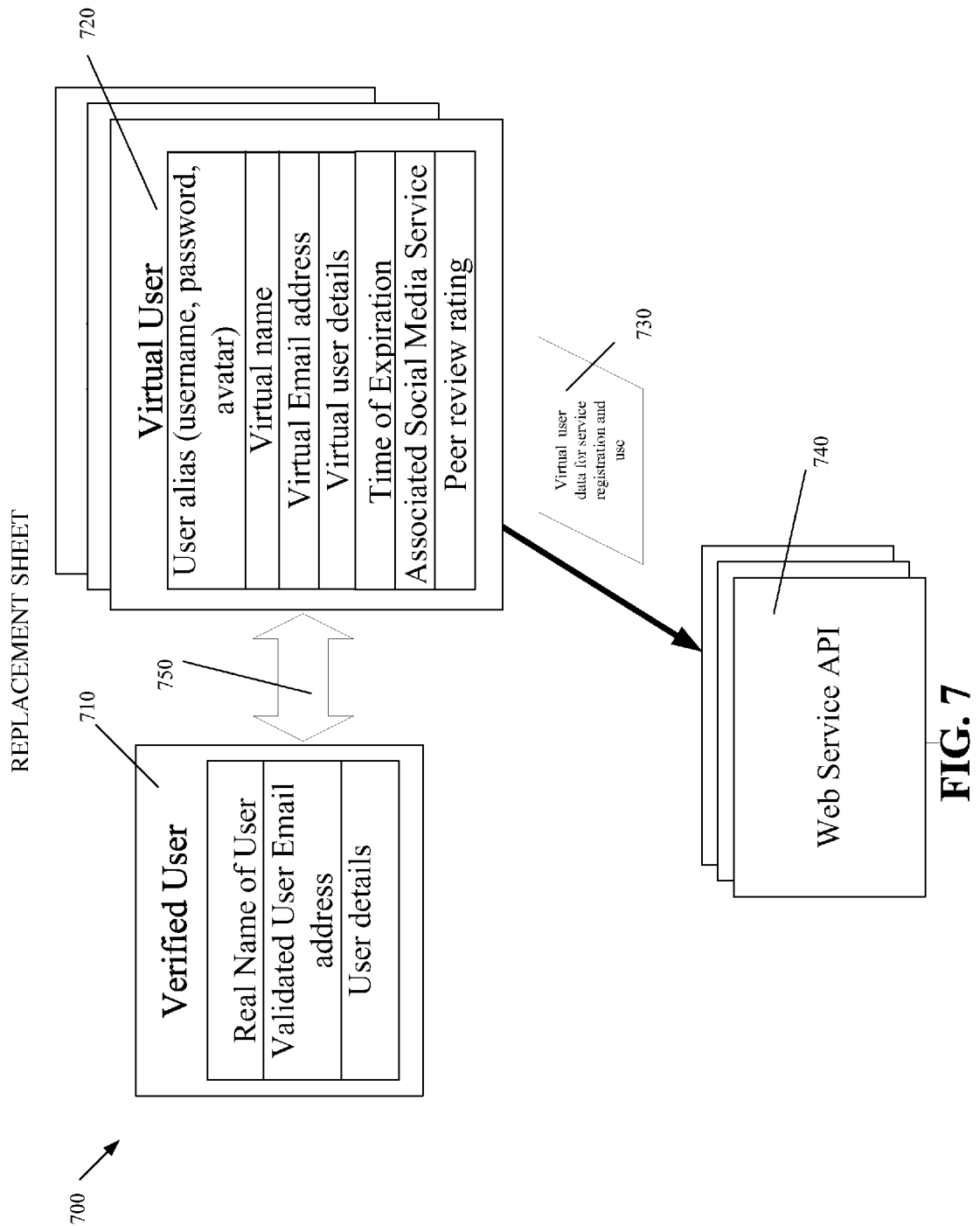
FIG. 7 conceptually illustrates alter-ego service processing of some aspects.

FIG. 7 conceptually illustrates the alter-ego service processing 700 of some aspects. Some aspects perform this processing to generate and provide, register, and login multiple alter-ego accounts with multiple social media services. Additionally, some aspects maintain an association between an alter-ego service user that has been verified by the alter-ego service.

The alter-ego service processing includes a linker 750 that associates the verified user data 710 with any number of virtual user data structures 720 designed for creating alter-ego accounts. Information kept in the verified user data, in this example, includes the real name of a user, the user's verified email address, and additional user details. Data structure 710 is one example of the type of data that may be stored as part of a verified alter-ego service user. However, other aspects may include different data fields such as physical address, photo(s), an avatar, etc.

Virtual user data structures 720 may include several virtual details that are generated by the alter-ego generation service. The alter-ego generation service produces the virtual details to register anonymous alter-ego accounts with different social media services. In an exemplary aspect the virtual user data structure includes data fields that may be required to register a new user with a social media service. In some aspects, the data structures may be different depending on the social media service that that alter-ego is for. However, in other aspects, the data structure may be the same for all virtual user instances. In such aspects it may not be necessary to populate all of the data fields. For instance, the virtual user data structure 720 may include the alias information (e.g., username, password, avatar, etc.). The virtual user data structure 720 may also include information such as a virtual name (e.g., a fake first and last name), a virtual email address, additional virtual user details, an expiration time for the particular virtual user, and the social media service that may be associated with the virtual user data. In some aspects the virtual email address is randomly generated and provided by the alter-ego provider service. The alter-ego generation service provides the capability verifying the email account for the social media service through a query to the alter-ego service provider. The randomly generated email address provides another level of anonymity for the alter-ego user.

When a request to generate an alter-ego account is received at the alter-ego generation server, the data in the virtual user data structure 720, or the necessary portions of the data structure may be provided to the web service by the web service's API 740. In the example illustrated in FIG. 7, registration data 730 is being provided to the web service through the web service API. The alter-ego provider server is capable of communicating with the web service using the APIs of various web services to provide seamless registration and login using the virtual user information.

In the preceding examples, the switch to an alter-ego account appears seamless to a user that is viewing a social media website at a web browser, meaning that upon receiving a command to switch to the alter-ego account, the user only sees that the account information (e.g., username, avatar, etc.) has changed. However, in some aspects, the alter-ego service may be configured at the client to prompt the user to determine which alter-ego account the user would like to switch to. In some aspects, the user may even request that a new account be generated because he may feel that his identity may be compromised if he uses the currently active alter-ego account.

Figure 8:
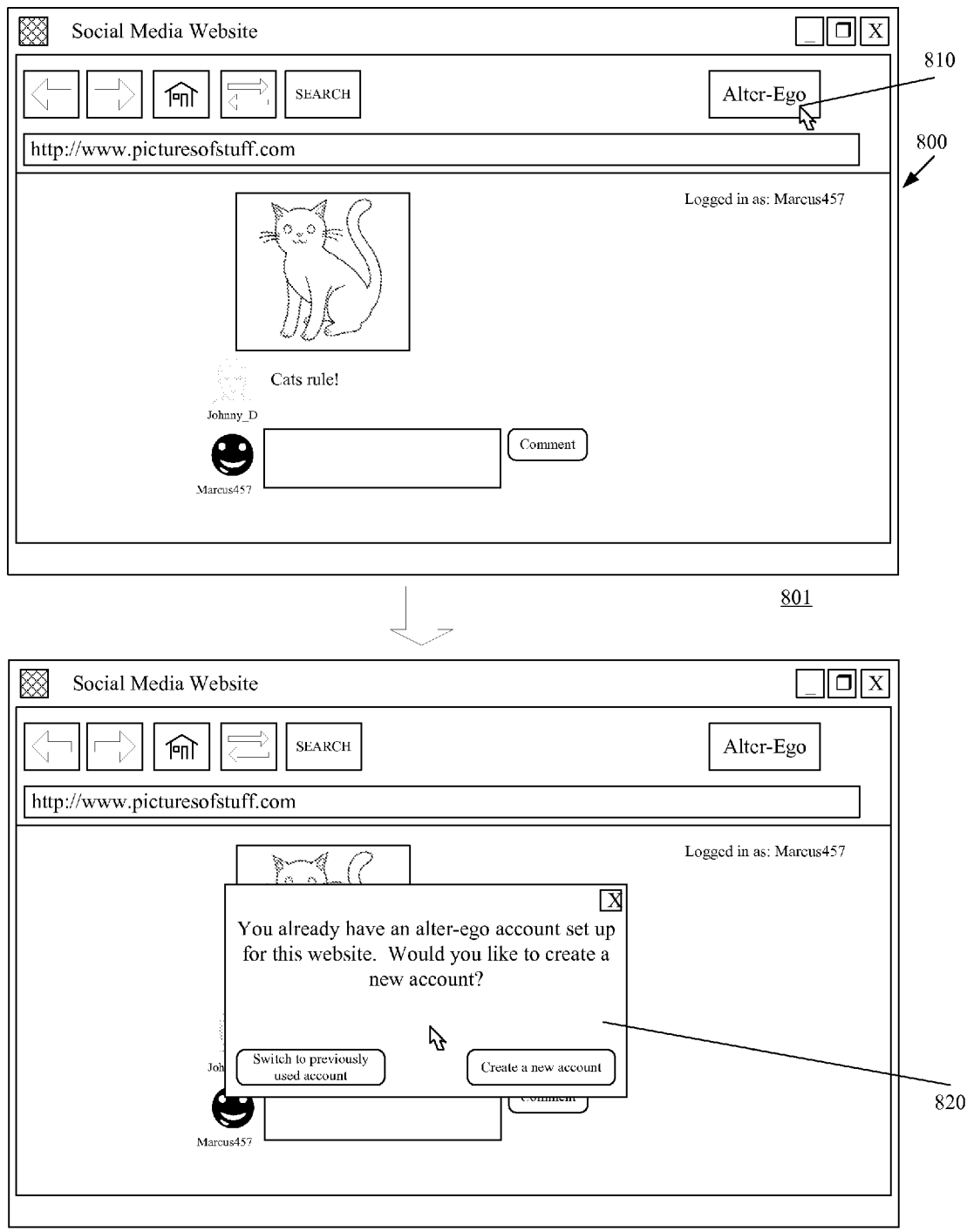
FIG. 8 illustrates and aspect of the invention that permits a user to select whether to send a command to the alter-ego generation server to use an already registered or create a new account.

FIG. 8 illustrates and aspect of the invention that permits a user to select whether to send a command to the alter-ego generation server to use an already registered alter-ego account or to generate, register, and login using a new account with new information. FIG. 8 illustrates two stages 801 and 802 of a user's interaction with a web browser 800, which causes a dialog to display enabling a user to select whether he would like to have the alter-ego provider service create and register a new alter-ego account. The web browser window 800 is similar to the browser window 200, which was described in detail with respect to FIG. 2.

The first stage 801 illustrates a user's interaction with the alter-ego selectable UI object 810. The user may interact with the alter-ego selectable UI object 810 by mouse click, tapping the object on a touch screen, or any other type of selection method. Upon interacting with the alter-ego selectable UI object 810, a new dialog 820 displays in the second stage 802. Dialog 820 provides the user an opportunity to request a new alter-ego account even though one may already exist for the particular user and the web service. When the user selects the option to create a new account, the alter-ego generation service will generate new virtual user information. The alter-ego generation service also automatically registers, and logs in a new account using the web service's API. The process of registering and logging onto the new alter-ego account appears seamless to the user, in some aspects, similar to the registration and login process discussed in relation to FIG. 2.

Figure 9:
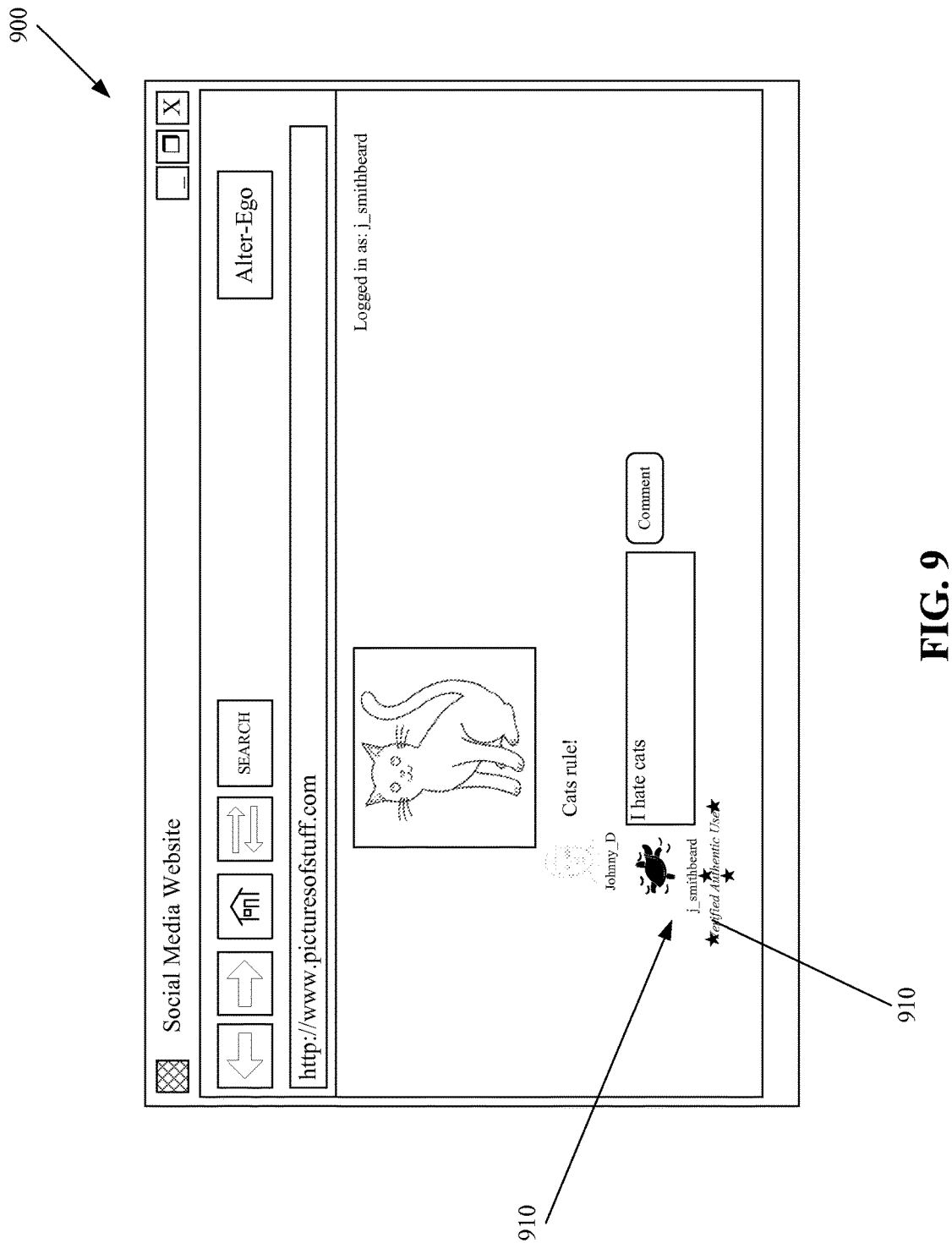
FIG. 9 illustrates an example of web browser window that shows an indication that a user is authentic.

Allowing the alter-ego provider service to integrate with a social media service may pose a number concerns for the social media service and users, some of which were discussed in the preceding description. Additionally, one such concern social media services and other user is may have is the ability to trust a user's authenticity. One aspect of the alter-ego provider service provides an option for displaying an indication that a user is authentic. FIG. 9 illustrates an example of web browser window 900 that shows an indication that a user is authentic. Web browser window 900 is similar to the web browser window 200 discussed with respect to FIG. 2. Similar to web browser window 200, web browser window 900 also includes a user representation 920. However, web browser window 900 also includes an authenticity indicator 910. In this example, authenticity indicator 910 appears somewhere near user representation 920 to alert users that at least some credentials of the user have been verified by the alter-ego provider service. This again provides the social media service with the comfort of accountability for the user's actions and provides users with comfort in knowing that the user has been verified and controls can be put in place if the user is involved in improper activities or activities that violate the social media service's terms of use.

Figure 10:
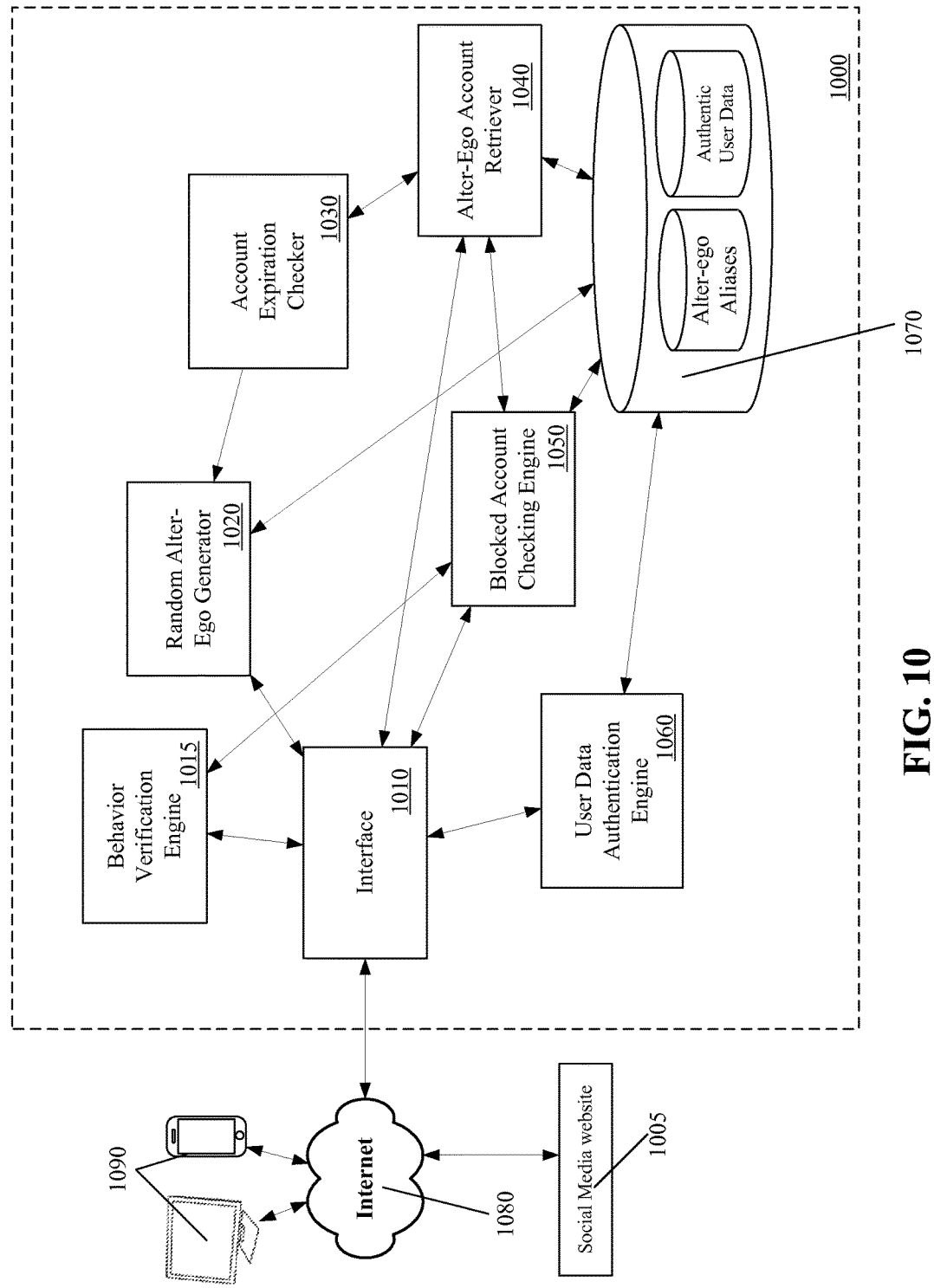
FIG. 10 conceptually illustrates a system architecture for an alter-ego generation server.

FIG. 10 conceptually illustrates a system architecture for an alter-ego generation system. As shown, the alter-ego generation system includes a server 1000. In some aspects, server 1000 may be the alter-ego generation server 130 described with respect to FIG. 1. The alter-ego generation server includes an interface 1010, a random alter-ego generator 1020, an account expiration checker 1030, an alter-ego account retriever 1040, a blocked account checking engine 1050, a user data authentication engine 1060 and a storage 1070 for storing alter-ego aliases and authenticated user data. The system also includes an Internet connection 1080, client devices 1090, and social media website 1005.

The interface 1010 is communicatively coupled to the random alter-ego generator 1020, the alter-ego account retriever, the blocked account checking engine 1050 and the user data authentication engine 1060. A client device 1090 may initiate communication with the alter-ego generation server 1000 by communicating over the Internet 1080. When a client is requesting creation of a new alter-ego account, the random alter-ego account generator may generate all of the necessary credentials required to register a new alter-ego account with a web service. The random alter-ego account generator may then store the new account details in the storage 1070 and provide the necessary registration information to the interface 1010. The interface 1010 may then communicate the required registration details over the Internet to the social media web service such as social media website 1005 to register the new alter-ego account.

A client device 1090 may also initiate communication with the alter-ego server 1000 to create a parent account. The parent account of some aspects includes authenticated data capable of tracing the user's identity. When the interface receives a request to create a new authenticated user, the user data authentication engine 1060 will collect the required data and use an authentication scheme to verify the user's authenticity. Such authenticity schemes may include sending an email to an email address that the user manually entered and requiring that the user perform some interaction with the email before the account can be created. Once the authentic user account is created, the user data authentication engine stores the user data in the storage 1070. When necessary, the user data authentication engine 1060 may also retrieve authenticated user data from the storage 1070.

In certain instances, a social media service may request that a particular user be blocked from using the social media service due to some violation of the social media service's terms of service. In such cases, the social media service may initiate contact with the alter-ego server 1000 to put a block on the user's alter-ego account, or verified user account when warranted. The blocked account checking engine 1050 will receive the request to block the user account (alter-ego account or verified user account) and store the block information in the storage 1070.

A client device 1090 may initiate contact with the alter-ego server 1000 to request alter-ego account information enabling the user to log on the social media website 1005 using the alter-ego account. In such instances, the interface will communicate with the alter-ego account retriever 1040 to retrieve the requested alter-ego account information for the requesting user. Once retrieved, the alter-ego account retriever 1040 will verify with the blocked account checking engine 1050 that a block has not been placed on the alter-ego account or user. If a block has been initiated, the blocked account checking engine 1050 will send a notification to the interface 1010 to alert the user that a block has been placed on the account.

If a block has not been placed on the account, the alter-ego account retriever 1040 will verify that the account has not expired (e.g., been active for longer than a specified duration) at the account expiration checker 1030. If the account has expired, the account expiration checker will notify the alter-ego account retriever 1040 that the alter-ego account is no longer valid. The alter-ego account retriever 1040 may flag the account as invalid in storage 1070. The account expiration checker 1030 may also send a request to the random alter-ego generator 1020 to create a new alter-ego account. The random alter-ego generator 1020 will provide alter-ego account information to the interface to perform the same registration process described in the preceding description. The random alter-ego generator 1020 will also store the new alter-ego information in the storage 1070.

If the retrieved account has not expired (e.g., is still valid), the alter-ego account retriever will send the alter-ego account information to the interface to perform the automatic login process described in the preceding description. In one aspect, the provided account information may include a username and password.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
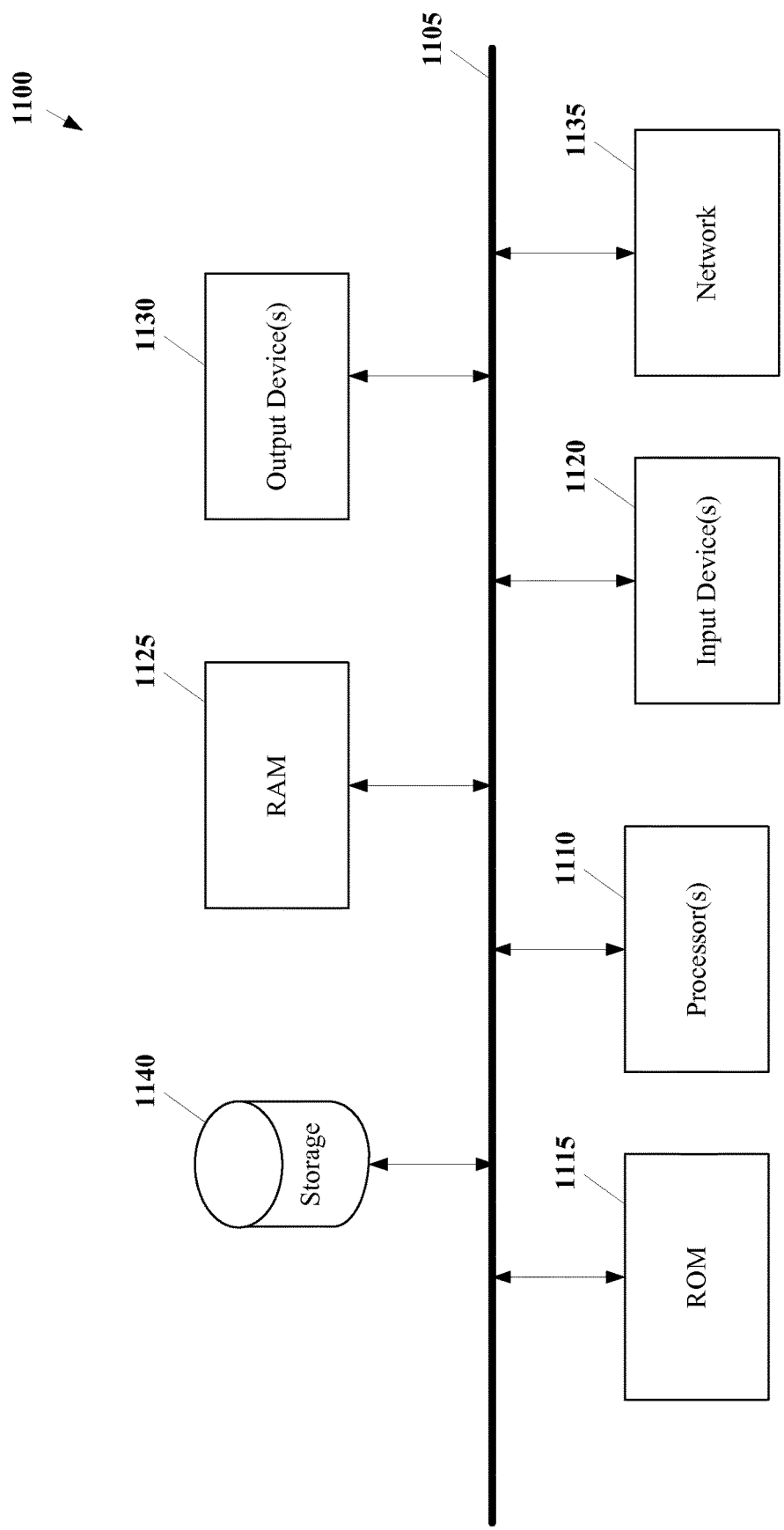
FIG. 11 illustrates an exemplary computer system that may implement the alter-ego provider service server.

FIG. 11 illustrates an exemplary computer system 1100 that may implement the alter-ego provider service server. The computer system includes various types of computer readable media and interfaces. The system includes a bus 1105, processors 1110, read only memory (ROM) 1115, input device(s) 1120, random access memory 1125), output device(s) 1130, a network component 1135, and a permanent storage device 1140.

The bus 1105 the communicatively connects the internal devices and/or components of the computer system. For instance, the bus 1105 communicatively connects the processor(s) 1110 with the ROM 1115, the RAM 1125, and the permanent storage 1140. The processor(s) 1110 retrieve instructions from the memory units to execute processes of the invention.

The ROM 1115 stores static instructions needed by the processor(s) 1110 and other components of the computer system. The ROM may store the instructions necessary for the processor to execute the web server, web application, or other web services. The permanent storage 1140 is a non-volatile memory that stores instructions and data when the computer system 1100 is on or off. The permanent storage 1140 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The RAM 125 is a volatile read/write memory. The RAM 1125 stores instructions needed by the processor(s) 110 at runtime. The bus 1105 also connects input and output devices 1120 and 1130. The input devices enable the user to communicate information and select commands to the computer system. The input devices 1120 may be a keyboard or a pointing device such as a mouse. The input devices 1120 may also be a touch screen display capable of receiving touch interactions. The output device(s) 1130 display images generated by the computer system. The output devices may include printers or display devices such as monitors.

The bus 1105 also couples the computer system to a network 1135. The computer system may be part of a local area network (LAN), a wide area network (WAN), the Internet, or an Intranet by using a network interface. The web service may be provided to the user through a web client, which receives information transmitted on the network 1135 by the computer system 100.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for" or, in the case of a method claim, the element is recited using the phrase "step for."

The invention claimed is:

1. A method of providing an anonymous identity for a user, the method comprising:
    a processing system;
    receiving by the processing system a request to switch an existing account of the user previously associated with one web service for which an account is required, of a plurality of web services to a new anonymous account associated with the one web service; and
    providing, by the processing system in response to the switching request, new login credentials associated with the new anonymous account to the one web service, wherein the new login credentials are required to register the new anonymous account of the user with the previously associated web service,
    wherein the new anonymous account is randomly generated by a service different from the web service and wherein the processing system generates a different random anonymous account associated with the new login credential of the user anonymous identity for each web service of the plurality of web services when a request to switch an account is received for each web service and wherein each of the plurality of web services requires an account.

2. The method of claim 1, wherein the anonymous account is associated with a user account associated with the different web service.

3. The method of claim 2, further comprising generating random login credentials for the anonymous account and associating the login credentials with the user account.

4. The method of claim 3, further comprising automatically registering the anonymous account with the web service.

5. The method of claim 4, wherein the anonymous account is automatically registered with the web service by providing virtual user information to an application programming interface (API).

6. The method of claim 5, wherein the virtual user information is associated with authentic user information not visible to the web service.

7. The method of claim 6, wherein the virtual information comprises an encrypted E-mail address, which when decrypted provides a valid user E-mail address.

8. The method of claim 1, further comprising retrieving the login credentials from a storage when an anonymous account was previously created for the web service.

* * * * *